(12) United States Patent
Vlad et al.

(10) Patent No.: US 9,473,796 B1
(45) Date of Patent: Oct. 18, 2016

(54) AUTOMATED APPLICATION OF MANUALLY REVIEWED VIDEOS USING MATCHING

(71) Applicant: Google Inc., Mountain View, CA (US)

(72) Inventors: Marius Vlad, Horgen (CH); Alexander Pak, Zurich (CH); Iakov Dlugach, Adliswil (CH); Roman Vorushin, Ruschilkon (CH); Holger Brandsmeier, Zurich (CH); Todd Gage, San Francisco, CA (US); Oliver Heckmann, Bach (CH); Johan Georg Granstrom, Zurich (CH)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 14/588,215

(22) Filed: Dec. 31, 2014

Related U.S. Application Data (60) Provisional application No. 61/922,383, filed on Dec. 31, 2013.

(51) Int. Cl.
| | |
|---|---|
| *H04N 21/222* | (2011.01) |
| *H04N 21/234* | (2011.01) |
| *H04N 21/239* | (2011.01) |
| *H04N 21/254* | (2011.01) |
| *H04N 21/258* | (2011.01) |
| *H04N 21/475* | (2011.01) |
| *H04N 21/83* | (2011.01) |
| *H04L 29/06* | (2006.01) |

(52) U.S. Cl.
CPC .......... *H04N 21/2541* (2013.01); *H04L 63/20* (2013.01); *H04N 21/2223* (2013.01); *H04N 21/239* (2013.01); *H04N 21/23418* (2013.01); *H04N 21/25816* (2013.01); *H04N 21/4756* (2013.01); *H04N 21/83* (2013.01)

(58) Field of Classification Search
CPC ..... G06F 9/44; G06F 17/30038; G06N 7/02; G06N 7/06; H04N 21/25883; H04N 21/654; H04N 21/454; H04N 21/2743; H04N 21/2541; H04N 21/23418; H04N 21/83; H04L 63/20
See application file for complete search history.

(56) References Cited

U.S. PATENT DOCUMENTS

| | | | |
|---|---|---|---|
| 8,069,176 B1 | 11/2011 | Ioffe et al. | |
| 8,706,675 B1 * | 4/2014 | Samaniego | G06Q 30/0201 706/52 |
| 2005/0240985 A1 * | 10/2005 | Alkove | G06F 21/10 726/1 |
| 2006/0106885 A1 * | 5/2006 | Blumenau | G06F 17/30085 |
| 2008/0059448 A1 * | 3/2008 | Chang | G06F 17/30707 |
| 2008/0059536 A1 * | 3/2008 | Brock | G06F 21/10 |

(Continued)

*Primary Examiner* — Randy Flynn
(74) *Attorney, Agent, or Firm* — Fenwick & West LLP (57) ABSTRACT

An access policy module automatically applies an access policy to a video. Access policies frequently require manual review of an item to determine a proper access policy for the video, such as whether the video should be taken down, age-limited, or permitted general access. Results of a manual review of a video are stored along with the portion of the video that was manually reviewed and the access policy applied to the video. When a trigger event occurs indicating access policies should be considered for a video, the video is compared to reviewed portions of videos that were manually reviewed to determine if an access policy can be automatically applied with sufficient confidence. When insufficient confidence is reached or conflicting access policies both have high confidence, the video is scheduled for manual review with a priority level based on the possible access level of the video.

24 Claims, 3 Drawing Sheets

(56) References Cited

U.S. PATENT DOCUMENTS

| | | | |
|---|---|---|---|
| 2008/0109369 A1* | 5/2008 | Su | G06Q 10/06 705/59 |
| 2008/0209502 A1* | 8/2008 | Seidel | G06F 17/30038 726/1 |
| 2009/0133048 A1* | 5/2009 | Gibbs | G06F 17/30038 725/14 |
| 2009/0144325 A1* | 6/2009 | Chastagnol | H04N 21/8545 |
| 2010/0262488 A1* | 10/2010 | Harrison | H04N 21/2743 705/14.46 |
| 2013/0298151 A1* | 11/2013 | Leske | G06F 21/10 725/25 |

* cited by examiner

AUTOMATED APPLICATION OF MANUALLY REVIEWED VIDEOS USING MATCHING

CROSS-REFERENCE TO RELATED APPLICATIONS

This application claims the benefit of Provisional Application 61/922,383, filed Dec. 31, 2013, which is incorporated by reference herein in its entirety.

BACKGROUND

1. Field of Art

The present disclosure generally relates to the field of digital video, and more specifically to improving systems for access policy decisions for videos.

2. Background of the Disclosure

Video sharing services permit users to upload videos to a video hosting site and sharing service, and share the uploaded videos with other users. These videos may be accessed by other users and viewed by a wide audience worldwide. Given the wide variety of types of video content, certain content may not be suitable for sharing with all users of the video sharing service. For example, certain content may not be suitable for sharing in a particular geographic area, or may be restricted by local law. Content may also not be suitable for users who are not members of the video sharing service, or for members below a certain age. Certain content may be undesirable for the video sharing service to host at all. Access policies are set by the video sharing service to permit or restrict access to videos accordingly.

It may be difficult to automatically classify a particular video. The video may therefore require manual review by an operator of the video sharing service to determine the proper access policy. This manual review is labor intensive. During the manual review process, an interim policy for the video may also be implemented that does not match the ultimately determined policy for the video. Delays in determining the correct policy for a video can impact user experiences, and may delay viewing of an otherwise permissible video, or may result in viewing of a video without appropriate restrictions, i.e., to a wider audience than desired.

SUMMARY

A video sharing system includes an access policy module that manages policies for videos stored and shared by the video sharing system. A trigger event initiates a determination of an access policy for a video. The trigger event may be the video reaching a specified number of views, a user flagging the video, the video being uploaded to the video sharing system, or the video being shared to another website, among other situations to determine an access policy. When a video is selected for determining an access policy, the access policy module attempts to automatically determine an access policy. When a policy cannot automatically be determined due to insufficient confidence in a policy, the access policy module adds the video to a review queue for manual review of the video and determines a priority for the video in the queue. Operators review videos in the review queue and determine access policies for the reviewed videos. A portion of the video responsible for the manually determined access policy is also identified. When reviewing the video, operators may indicate at least a portion of the video responsible for the manually determined access policy, or the portion viewed by the operator may be automatically selected as the responsible portion. The access policy for the video and the portion of the video responsible for the policy are stored.

The manually determined access policy is used to classify subsequent videos that include content overlapping with the manually classified video. The access policy module attempts to match some or all of a subject video against portions of previously-classified videos. The access policy module uses the matching portions to calculate a confidence score reflecting a likelihood that an access policy for the previously-classified videos can also be correctly applied to the subject video. The confidence value may be used to determine whether a confidence value for the match is sufficient to allow for an automated policy decision. The confidence for a given access policy is determined using various factors, such as the number of matching videos for the access policy, the amount of overlapping video that match the subject video, the uploading user, and/or any other factors suitable to the implementer.

When a confidence score is sufficiently high, an access policy is automatically applied to the video. If confidence scores are high relative to several possible access policies, the access policy module applies rules that determine which access policy is automatically applied. In one embodiment, the access policies are ordered, such that a sufficient confidence score for a higher-ordered access policy is applied regardless of the confidence score for lower-ordered access policies. In another embodiment, the access policies are partially ordered, such that several access policies with the same level may result in high confidence scores, in which case no access policy is automatically applied. In an embodiment, when no access policy is automatically applied, the access policy module determines a priority for the video to insert the video in a queue for manual review. In various embodiments, the priority for the video is selected using the trigger event, the confidence level of each access policy, the number of matching videos for each access policy, and any combination of similar factors.

Accordingly, manually determined access policies for videos are leveraged to determine access policies for subsequent videos, which obviates repetitive manual review of videos where portions of the video have already been reviewed. Thus the access policy module permits the video sharing system to receive more videos and process the videos with the same or fewer manual reviews of videos, improving the total throughput of access policy determinations while maintaining high-quality accuracy. The automatic review of the access policy module can also provide automatic policy determinations without requiring a manual reviewer to precisely designate fine-grained portions of the video that generated the policy—the automatic review can be performed using the portions of a reviewed video that the reviewer viewed. This reduces the burden on the reviewer and permits faster review of videos by the reviewer, without overhead of more specifically designating portions of the video for processing by the access policy module.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

Figure 1:
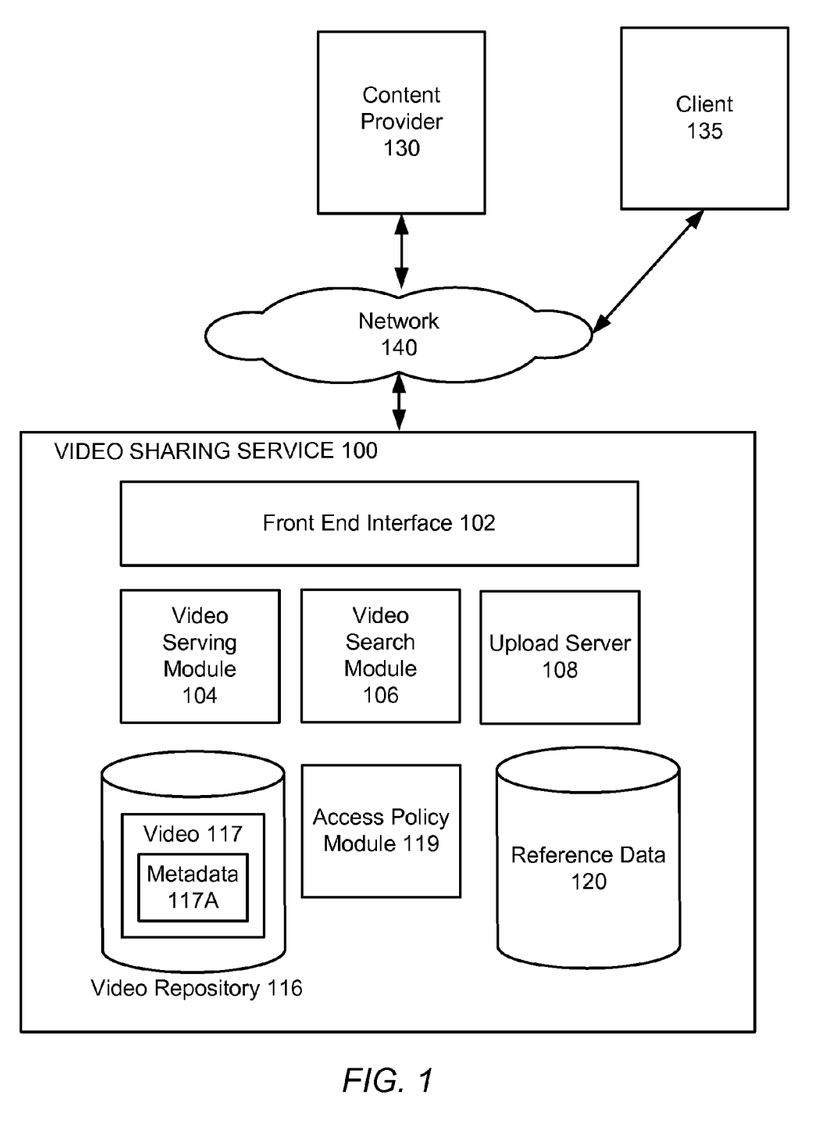
FIG. 1 is a block diagram of an example video sharing service in which access policies for videos are automatically applied, according to one embodiment.

FIG. 1 is a block diagram of a video sharing service 100 (also referred to as a video sharing system) in which access policies for videos are automatically applied, according to one embodiment. The video sharing service 100 represents a system that stores videos provided by content providers 130 and makes the videos available to clients such as client device 135. The video sharing service 100 communicates with a plurality of content providers 130 and client devices 135 via a network 140 to facilitate sharing of video content between users. Note that for the sake of clarity FIG. 1 depicts only one instance of content provider 130 and client device 135, though there could be any number of each.

The video sharing service 100 additionally includes a front end interface 102, a video serving module 104, a video search module 106, an upload server 108, a video repository 116, and a reference database 120. Other conventional features, such as firewalls, load balancers, authentication servers, application servers, failover servers, site management tools, and so forth are not shown so as to more clearly illustrate the features of the video sharing service 100. One example of a suitable service 100 is the YOUTUBE website, found at www.youtube.com. Other video hosting sites are known as well, and can be adapted to operate according to the teachings disclosed herein. The illustrated components of the video sharing service 100 can be implemented as single or multiple components of software or hardware. In general, functions described in one embodiment as being performed by one component can also be performed by other components in other embodiments, or by a combination of components. Furthermore, functions described in one embodiment as being performed by components of the video sharing service 100 can also be performed by one or more clients 135 in other embodiments if appropriate.

Conceptually, the content provider 130 provides video content to the video sharing service 100 and the client 135 views that content. In practice, content providers may also be content viewers. Additionally, the content provider 130 may be the same entity that operates the video sharing service 100.

The content provider 130 operates a client device to perform various content provider functions. Content provider functions may include, for example, uploading a video file to the video sharing service 100, editing a video file stored by the video sharing service 100, or editing content provider preferences associated with a video file. Content providers 130 also provide identifiers for their content to video sharing service 100. For example, a content provider 130 may provide sharing service 100 with fingerprints for videos to which the content provider 130 claims an intellectual property right. In one embodiment, video sharing service 100 separates the fingerprints into LSH bands and stored in reference database 120.

Client devices 135 are computing devices that execute client software, e.g., a web browser or built-in client application, to connect to the front end interface 102 of the video sharing service 100 via a network 140 and to display videos. The client device 135 may be, for example, a personal computer, a personal digital assistant, a smart phone, a laptop computer, a television "set-top box," or other computing device for displaying videos to a user. Client 135 may also be used to configure viewer preferences related to video content. In some embodiments, the client 135 includes an embedded video player such as, for example, the FLASH player from Adobe Systems, Inc. or any other player adapted for the video file formats used in the video sharing service 100. Note that the terms "client" and "content provider" as used herein may refer to software providing client and content providing functionality, to hardware on which the software executes, or to the entities operating the software and/or hardware, as is apparent from the context in which the terms are used.

The upload server 108 of the video sharing service 100 receives video content from a client 135. Received content is stored in the video repository 116. In response to requests from clients 135, a video serving module 104 provides video data from the video repository 116 to the clients 135. Clients 135 may also search for videos of interest stored in the video repository 116 using a video search module 106, such as by entering textual queries containing keywords of interest. Front end interface 102 provides the interface between client 135 and the various components of the video sharing service 100.

The video repository 116 contains a set of videos 117 submitted by content providers 130 (which as noted may also include users of client 135). The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 may further have associated metadata 117A, e.g., textual metadata such as a title, description, and/or tags provided by a content provider 130 who uploaded the video.

The metadata 117A also includes an access policy associated with the video. The access policy designates limitations, if any, on providing the video to a client. For example, an access policy may designate no restrictions, that a user must be age-verified prior to viewing a video, that a video may not be viewed by users in a particular country, or that the video may not be viewed by anyone ("taken down"). The raw video and audio for videos taken down may be deleted from the video sharing service 100, though metadata and other descriptors of the video may be maintained to determine other videos similar to the taken down video. In various embodiments, some aspects of the access policy may be set by the content provider 130, by a third-party rights owner (not shown), by video sharing service 100, or various combinations thereof. For example, in embodiments in which content provider 130 uploads content to which a content owner (a potentially different entity) has rights, the content owner may specify various aspects of the access policy, such as whether the content may be viewed by others, viewed in exchange for advertising revenue, blocked entirely, etc. Other policy determinations, for example whether a particular content item includes unacceptable content for the video sharing service 100, are made by video sharing service 100. These determinations are described below with respect to an access policy module 119.

The video sharing service 100 further comprises an access policy module 119 that determines and assigns access policies to a video 117. The access policy module 119 determines whether to automatically assign an access policy to a video 117, and if no access policy can be automatically assigned, the access policy module 119 determines a priority for the video to enter a queue for manual review by an operator of the video sharing service 100.

The access policy module 119 receives a subject video for which to determine an access policy. The access policy module 119 typically receives the subject video responsive to a trigger event. For example, a trigger event in one embodiment is the uploading of a new video, in which case the upload server 108 provides the uploaded video to the access policy module 119. In another embodiment, the trigger event is a client flagging a video as being inappropriate or otherwise being a candidate for restricted access to the front end interface 102. Automated analysis of a video may also suggest that the video is similar to other videos subject to an access policy, for example by the use of a computer model or other classifier, which also constitutes a trigger event.

Each video in repository 116 is associated with a fingerprint of the video stored in reference database 120. The fingerprint is a unique or near unique representation of the video, and includes a fingerprint for portions of the video that may be used to match part of one video to part of another video and thereby determine whether the video content in one video is the same as the video content in another video. For example, the fingerprint can be used to identify that minutes 29-30 in one video contain the same content as minutes 13-14 in another video. In one embodiment, videos are indexed to a reference index to facilitate matching of video contents. One example process using LSH-based retrieval and matching is described in U.S. Pat. No. 8,069,176, which is incorporated by reference here in its entirety. References in this specification describing matching of video content thus presume a familiarity by those of skill in the art with at least the methods publicly described there, and other matching methodologies known by those of skill in the art may be equally suitable.

This fingerprint may be generated by the video sharing system 100 when a video is uploaded to the upload server 108, or the fingerprint may be generated by the access policy module 119 when the trigger event occurs. The fingerprint of a video may comprise sub-fingerprints identifying portions of the video. For example, each fingerprint may be made up of sub-fingerprints describing a quarter of a second (0.25 s) of video. In one example, each fingerprint of the video is summarized using Locality Sensitive Hashing (LSH) to divide the sub-fingerprints into LSH bands describing the sub-fingerprints. In one embodiment, each LSH band comprises 4 bytes from 100 bytes of data in the sub-fingerprint. The LSH bands in one embodiment are stored as the identifier of the video in the reference data 120.

Figure 2:
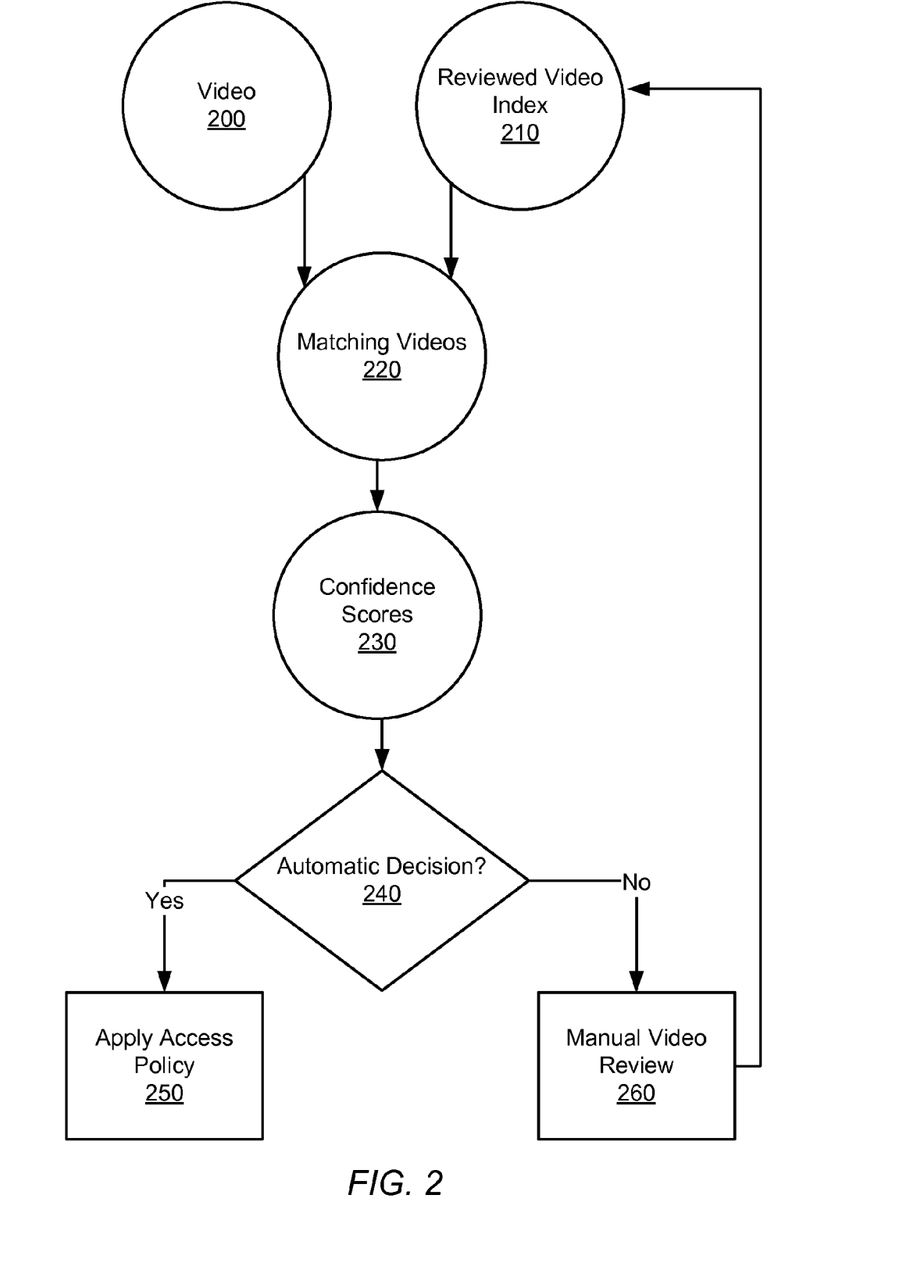
FIG. 2 provides an overview of a process for using reviewed videos to automatically assign an access policy to a video, according to one embodiment.

FIG. 2 provides an overview of a process for using reviewed videos to automatically assign an access policy to a video according to one embodiment. A video 200 is received by the access policy module 119. Access policy module 119 fingerprints the video (if a fingerprint does not already exist) and attempts to match the received video with other videos previously indexed by video hosting service 100. This results in a set of candidate matching videos that access policy module 119 will consider in attempting to automatically determine a correct policy for the received video.

When the video is manually reviewed, the reviewer indicates the appropriate policy and a portion or portions of the video responsible for the policy selection are identified. The reviewer may designate the portion or portions of the video, or the portion(s) may be automatically selected based on the portion(s) viewed by the reviewer when the policy was selected. Access policy module 119 stores an identifier of the reviewed video in the reviewed video index 210 along with data describing the access policy assigned to the video and the portions indicated as responsible for the policy decision. This permits the reviewer's access policy to be applied automatically to later videos that match the portion of the video reviewed by the reviewer.

Matches are determined between the video 200 and videos specified in reviewed video index 210 to determine portions of the video 200 that match portions of videos 220 in the reviewed video index 210. The reviewed video index 210 includes access policies previously designated for videos in the video sharing service 100. These videos and access policies may be limited to trusted access policies, such as those access policies that were set manually by an operator of the video sharing service 100 or those access policies that were assigned an access policy with high confidence by the access policy module 119. The reviewed video index 210 also indicates the portions of video that were reviewed, manually or automatically, to determine the access policy for the videos in the index. These portions of video that were viewed are termed the review portion of the video. The review portion may comprise, for example, 30 seconds or a minute of a video. The review portion may be the beginning of the video, or portions of the video throughout, such as the first 30 seconds, last 30 seconds, and 30 seconds at 5-minute intervals throughout the video. Thus, the review portion reflects the part of a video that formed the basis for the automated decision or a reviewer's decision to apply a particular policy to the video.

Next, the access policy module 119 determines which videos in the reviewed video index 210 are matched by the video 200 to determine matching videos 220. That is, the access policy module 119 determines whether the video 200 includes video content that is also present in the review portion of any of the videos that have already had access policies determined. The fingerprints of the video 200 stored at reference data 120 are compared against the reviewed portion of the fingerprints of the videos in the reviewed video index 210 to determine the matching videos 220 and an amount of the review portion from the matching videos 220 that matches the video 200.

Using the matching videos, the access policy module 119 generates confidence scores 230 for each access policy of any matching video. The confidence scores reflect the likelihood that the video should have any particular policy applied. In one embodiment, a confidence score is calculated individually for each such access policy such that several access policies may receive high confidence. For example, a confidence score may be calculated for a take down policy at 20%, to age-limit the video at 85%, and to not limit the video at 95%. Each confidence score is generated relative to the matching videos 220 for that access policy. The portion of the video in the reviewed portion of a matching video is used to assist in calculating a confidence value. In one embodiment, the confidence score is calculated using the percentage of the video in the matching video, e.g., 45 seconds of the video matching a 50 second review portion receive a confidence score of 90% (45 s/50 s). In various embodiments, this percentage is combined with various other factors, such as additional videos for a particular policy that match, or a the number of videos that match. By determining matching videos 220 to the reviewed video index 210 using fingerprints of the videos, the access policy module 119 may compare a video 200 to thousands or hundreds of thousands of reviewed videos quickly to determine confidence scores 230 for a video.

Next, the access policy module 119 determines whether an automatic decision can be applied using the individual confidence scores of each access policy. The access policies in one embodiment are ordered, such that if a higher-ordered access policy receives a confidence score above a threshold, then that access policy is applied. In the example above, a "take down" policy is a higher order than "age-limit," which is a higher order than "no limit." If the threshold confidence value is 75%, the "age-limit" access policy's confidence value of 85% is above that threshold and can be automatically selected for the video.

The access policies may also be partially ordered, such that two or more access policies of the same order may receive confidence scores above the threshold. In this case, no decision can be made if the two access policies cannot be applied at the same time to the video. For example, an access policy to legally age-limit a video may not be applied with an access policy to permit parental permission before viewing a video. This may prevent automatic selection between these access policies. When an automatic decision 240 can be applied with sufficient confidence, the access policy is applied 250. When no automatic decision can be applied, the video is scheduled for manual review 260.

When the video is scheduled for manual review, the access policy module 119 also determines a priority level for the video to enter the manual review queue. The priority level permits the video to enter the queue at a part of the queue relative to the priority level. The priority level is determined based on the confidence level of the video with respect to the various access levels. For example, the priority level of a video that scored just under the threshold of a high-level access policy (e.g., a take down) is given a higher priority score compared to a video that scored under the threshold for a lower-level access policy (e.g., to age-limit a video). An interim policy may be applied to the video, based on the priority level of the video, such as restricting access to the video until the video is manually reviewed.

Figure 3:
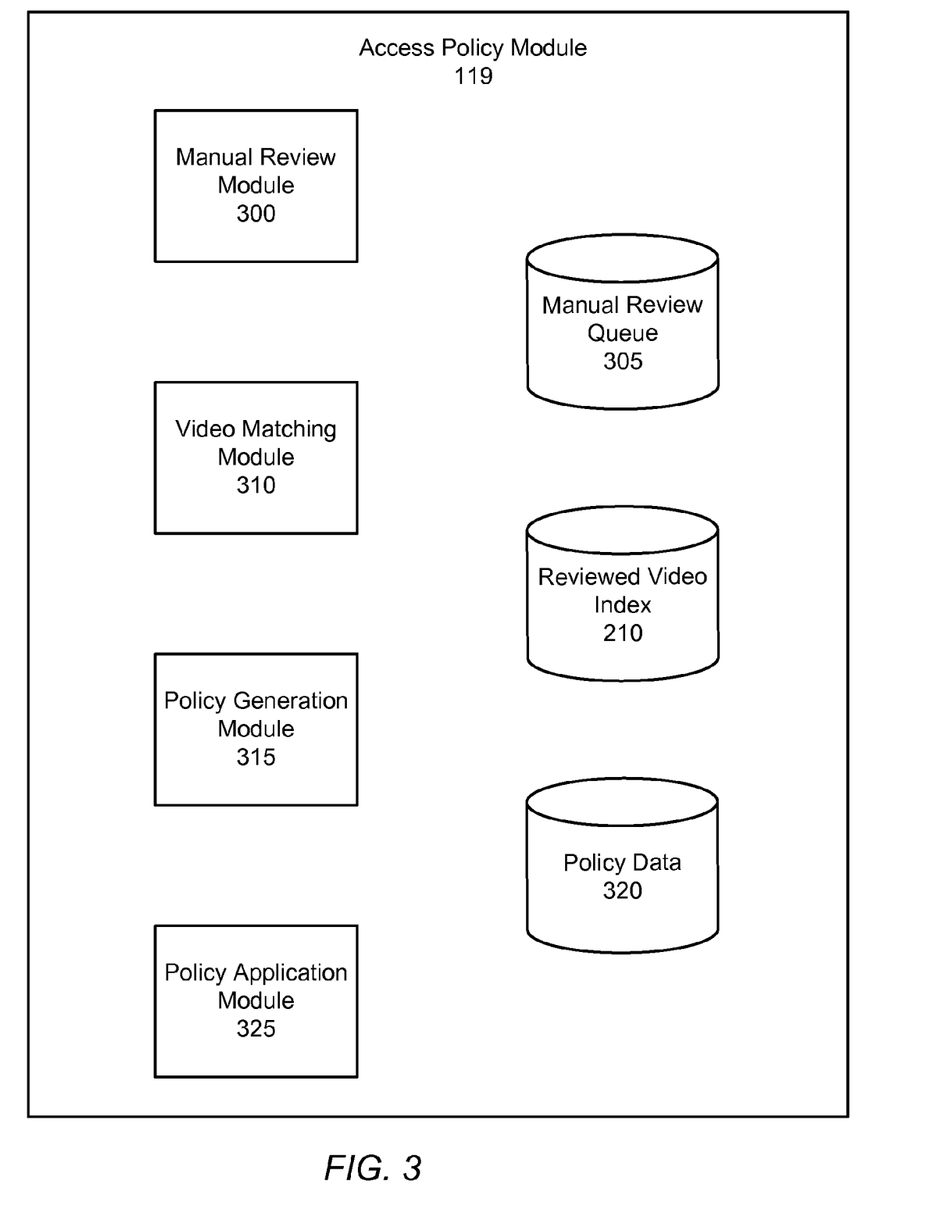
FIG. 3 shows components of an access policy module, according to one embodiment.

FIG. 3 shows components of an access policy module 119 according to one embodiment. The access policy module 119 includes various further components and data stores for applying access policies. The access policy module 119 includes a manual review module 300 and a manual review queue 305. The manual review queue 305 maintains a queue of videos for review, ordered in various embodiments by the priority level of each video. The manual review module 300 manages individual review of videos by reviewers authorized by an operator of the video sharing service 100. When a reviewer requests a new video, the manual review module 300 accesses the next video in the manual review queue 305 and provides the next-highest priority video for review. After review, the manual review module 300 receives an access policy and identifies a review portion of the video shown to the reviewer. The manual review module 300 stores an identifier of the reviewed video in the reviewed video index 210. The access policy for the video is stored in policy data 320, which stores policies applied to reviewed videos. The access policy determined by the user is passed to the policy application module 325.

As described above, the reviewed video index 210 stores an indicator for reviewed videos and reviewed portions of the reviewed videos, which may include an identification of the fingerprint applicable to the reviewed portion.

The access policy module 119 also includes a video matching module 310 to match received videos with videos in the reviewed video index 210. As described with respect to FIG. 2, the access policy module 119 compares an unreviewed video with the reviewed videos to determine whether an access policy can be applied to the video automatically. The video matching module 310 determines portions of the reviewed videos matched by the subject video. The video matching module 310 determines or accesses an identifier of the subject video describing portions of the subject video (e.g., each 30 seconds of the video), and queries the reviewed video index 210 using the identifier of the subject video. In one embodiment, the video matching module 310 queries the reviewed video index 210 or reference data 120 using LSH bands of a fingerprint of the subject video. After identification of possible matching videos in the index using the LSH bands, the video matching module 310 analyzes the fingerprint of the subject video against the possible matching videos to determine whether the possible matching video is a match, and if so what portions of the videos match. The matching videos are provided to the policy generation module 315 to determine a policy to apply to the video. Additional details regarding fingerprinting and LSH matching analysis are described above.

The policy generation module 315 receives the subject video and matching videos from the video matching module 310 and determines whether to automatically apply an access policy to the video. The policy generation module 315 accesses the policy data 320 to determine access policies applied to the matching videos, and analyzes the review portion of the matching videos to determine confidence scores for each access policy as described above. Using the confidence scores, the policy generation module 315 determines whether to automatically apply an access policy to the video and provides the policy to the policy application module 325. As described above, when an access policy does not score above a threshold to be automatically applied, the policy generation module 315 determines a priority level for the video and adds the video to the manual review queue 305.

Policy application module 325 receives an access policy for a video from a manual reviewer or from the policy generation module 315 and applies the policy to the video by updating metadata 117A about the video.

Using these techniques, the review of previously reviewed videos is extended to other videos which have not yet been reviewed. This permits the video sharing service 100 to process additional videos and obviates manual review for videos meeting sufficient confidence scores for a policy. The look-up of a video by a fingerprint also permits the system to easily determine matching videos and associated policies to quickly generate a score for the video.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for the sake of example, and not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present disclosure is intended to be illustrative, but not limiting, of the scope of the disclosure, which is set forth in the following claims.

What is claimed is:

1. A method for reducing delay in manual review of videos with respect to access policies comprising:
   accessing a set of reviewed videos each associated with at least one of a plurality of access policies based on a reviewed portion of the reviewed video;
   receiving a request to determine an access policy for a video without an access policy;
   selecting a set of matching videos from the set of reviewed videos, the matching videos including a matching portion of the review portion, the matching portion at least partially matching a portion of the video;
   determining a plurality of confidence scores each associated with one of a plurality of access policies each associated with at least one of the matching videos in the set of matching videos, the confidence score of one of the access policies based on the matching portion of the at least one matching videos; and
   responsive to a determination that none of the confidence scores of the access policies is higher than a plurality of policy thresholds corresponding to the access policies, scheduling the video in a manual review queue; and
   determining a priority level for the video to enter the manual review queue, the priority level permitting the video to enter the queue so that the video is reviewed sooner if it has a high priority level relative to a lower priority level.

2. The method of claim 1, wherein the received request for determining an access policy is responsive to a trigger event.

3. The method of claim 2, wherein the trigger event is an upload of the video or a complaint received from a user about the video.

4. The method of claim 1, wherein the plurality of access policies are ordered, the method further comprising:
   responsive to a determination that at least one of the confidence scores of one of the access policies is higher than a corresponding one of the policy thresholds, automatically applying one of the access policies to the video, wherein the applied access policy is a highest ordered access policy having a confidence score higher than the corresponding policy threshold.

5. The method of claim 1, wherein the plurality of access policies are at least partially ordered, the method further comprising:
   responsive to a determination that a plurality of the confidence scores of a plurality of the access policies having a same level in the order are higher than their corresponding policy thresholds,
   scheduling the video in the manual review queue.

6. The method of claim 1, wherein the priority level is determined based on at least one of the confidence scores of at least one of the access policies.

7. The method of claim 6, wherein the priority level is based on an order of the access policies corresponding to the confidence scores.

8. The method of claim 1 further comprising: responsive to the determination, applying an interim policy to the video based on the priority level.

9. A non-transitory computer-readable medium comprising instructions that when executed by a processor cause the processor to perform the steps for reducing delay in manual review of videos with respect to access policies, the steps comprising:
   accessing a set of reviewed videos each associated with at least one of a plurality of access policies based on a reviewed portion of the reviewed video;
   receiving a request to determine an access policy for a video without an access policy;
   selecting a set of matching videos from the set of reviewed videos, the matching videos including a matching portion of the review portion, the matching portion at least partially matching a portion of the video;
   determining a plurality of confidence scores each associated with one of a plurality of access policies each associated with at least one of the matching videos in the set of matching videos, the confidence score of one of the access policies based on the matching portion of the at least one matching videos; and
   responsive to a determination that none of the confidence scores of the access policies is higher than a plurality of policy thresholds corresponding to the access policies,
      scheduling the video in a manual review queue; and
      determining a priority level for the video to enter the manual review queue, the priority level permitting the video to enter the queue so that the video is reviewed sooner if it has a high priority level relative to a lower priority level.

10. The non-transitory computer-readable medium of claim 9, wherein the received request for determining an access policy is responsive to a trigger event.

11. The non-transitory computer-readable medium of claim 10, wherein the trigger event is an upload of the video or a complaint received from a user about the video.

12. The non-transitory computer-readable medium of claim 9, wherein the plurality of access policies are ordered, the steps further comprising:
   responsive to a determination that at least one of the confidence scores of one of the access policies is higher than a corresponding one of the policy thresholds,
      automatically applying one of the access policies to the video, wherein the applied access policy is a highest ordered access policy having a confidence score higher than the corresponding policy threshold.

13. The non-transitory computer-readable medium of claim 9, wherein the plurality of access policies are at least partially ordered, the method further comprising:
   responsive to a determination that a plurality of the confidence scores of a plurality of the access policies having a same level in the order are higher than their corresponding policy thresholds,
      scheduling the video in the manual review queue.

14. The non-transitory computer-readable medium of claim 9, wherein the priority level is determined based on at least one of the confidence scores of at least one of the access policies.

15. The non-transitory computer-readable medium of claim 14, wherein the priority level is based on an order of the access policies corresponding to the confidence scores.

16. The non-transitory computer-readable medium of claim 9, the steps further comprising: responsive to the determination, applying an interim policy to the video based on the priority level.

17. A system comprising:
   a processor configured to execute instructions;
   a memory storing instructions that when executed on the processor cause the processor to perform steps for reducing delay in manual review of videos with respect to access policies, the steps comprising:
      accessing a set of reviewed videos each associated with at least one of a plurality of access policies based on a reviewed portion of the reviewed video;
      receiving a request to determine an access policy for a video without an access policy;
      selecting a set of matching videos from the set of reviewed videos, the matching videos including a matching portion of the review portion, the matching portion at least partially matching a portion of the video;
      determining a plurality of confidence scores each associated with one of a plurality of access policies each associated with at least one of the matching videos in the set of matching videos, the confidence score of one of the access policies based on the matching portion of the at least one matching videos; and
      responsive to a determination that none of the confidence scores of the access policies is higher than a plurality of policy thresholds corresponding to the access policies,
         scheduling the video in a manual review queue; and
         determining a priority level for the video to enter the manual review queue, the priority level permitting the video to enter the queue so that the video is reviewed sooner if it has a high priority level relative to a lower priority level.

18. The system of claim 17, wherein the received request for determining an access policy is responsive to a trigger event.

19. The system of claim 18, wherein the trigger event is an upload of the video or a complaint received from a user about the video.

20. The system of claim 17, wherein the plurality of access policies are ordered, the steps further comprising:
   responsive to a determination that at least one of the confidence scores of one of the access policies is higher than a corresponding one of the policy thresholds,
      automatically applying one of the access policies to the video, wherein the applied access policy is a highest ordered access policy having a confidence score higher than the corresponding policy threshold.

21. The system of claim 17, wherein the plurality of access policies are at least partially ordered, the steps further comprising:
   responsive to a determination that a plurality of the confidence scores of a plurality of the access policies having a same level in the order are higher than their corresponding policy thresholds,
      scheduling the video in the manual review queue.

22. The system of claim 17, wherein the priority level is determined based on at least one of the confidence scores of at least one of the access policies.

23. The system of claim 22, wherein the priority level is based on an order of the access policies corresponding to the confidence scores.

24. The system of claim 17, the steps further comprising: responsive to the determination, applying an interim policy to the video based on the priority level.

* * * * *